(12) United States Patent
Bhardwaj et al.

(10) Patent No.: US 11,468,070 B2
(45) Date of Patent: Oct. 11, 2022

(54) METHOD AND SYSTEM FOR PERFORMING CONTEXT-BASED SEARCH

(71) Applicant: Innoplexus AG, Eschborn (DE)

(72) Inventors: Gunjan Bhardwaj, Taunus (DE); Gaurav Tripathi, Pune (IN); Vatsal Agarwal, Rampur (IN); Mohammad Laaeq Siddique, Lucknow (IN); Dileep Dharma, Pune (IN)

(73) Assignee: Innoplexus AG, Eschborn (DE)

( * ) Notice: Subject to any disclaimer, the term of this patent is extended or adjusted under 35 U.S.C. 154(b) by 251 days.

(21) Appl. No.: 15/855,472

(22) Filed: Dec. 27, 2017

(65) Prior Publication Data

US 2018/0365297 A1  Dec. 20, 2018

Related U.S. Application Data

(60) Provisional application No. 62/521,325, filed on Jun. 16, 2017.

(51) Int. Cl.
| | |
|---|---|
| *G06F 16/2457* | (2019.01) |
| *G06F 16/22* | (2019.01) |
| *G06F 16/242* | (2019.01) |
| *G06F 16/2452* | (2019.01) |
| *G06F 16/36* | (2019.01) |
| *G06F 16/33* | (2019.01) |

(52) U.S. Cl.
CPC .... *G06F 16/24575* (2019.01); *G06F 16/2228* (2019.01); *G06F 16/2423* (2019.01); *G06F 16/24522* (2019.01); *G06F 16/3344* (2019.01); *G06F 16/367* (2019.01)

(58) Field of Classification Search
CPC .......... G06F 16/24575; G06F 16/3344; G06F 16/367; G06F 16/24522; G06F 16/2423; G06F 16/2228
See application file for complete search history.

(56) References Cited

U.S. PATENT DOCUMENTS

| | | | | |
|---|---|---|---|---|
| 6,460,034 | B1* | 10/2002 | Wical | G06F 16/334 |
| 2003/0022164 | A1* | 1/2003 | Mills, Jr. | B82Y 10/00 |
| | | | | 435/6.13 |
| 2006/0053174 | A1* | 3/2006 | Gardner | G06F 16/38 |
| | | | | 707/999.203 |
| 2006/0053175 | A1* | 3/2006 | Gardner | G16H 70/00 |
| 2012/0084047 | A1* | 4/2012 | Vesterdal | B65G 67/00 |
| | | | | 702/141 |
| 2012/0296880 | A1* | 11/2012 | Chen | G16B 50/00 |
| | | | | 707/692 |
| 2015/0033116 | A1* | 1/2015 | McKinney | G06F 40/14 |
| | | | | 715/239 |

(Continued)

OTHER PUBLICATIONS

Google Search (Year: 2009).*

(Continued)

*Primary Examiner* — Mark D Featherstone
*Assistant Examiner* — Kweku William Halm
(74) *Attorney, Agent, or Firm* — Ziegler IP Law Group, LLC

(57) ABSTRACT

A method and a system for performing context-based search. The method is executed by a processing module. The method includes developing a search database, developing a search query, and retrieving at least one context-based data-record from the search database.

10 Claims, 5 Drawing Sheets

(56) References Cited

U.S. PATENT DOCUMENTS

| | | | | |
|---|---|---|---|---|
| 2016/0140858 A1* | 5/2016 | Adderly | ............... | G06F 40/30 |
| | | | | 704/9 |
| 2017/0091320 A1* | 3/2017 | Psota | ................. | G06F 16/313 |
| 2018/0349425 A1* | 12/2018 | Hazel | .................. | G06F 16/83 |
| 2019/0354544 A1* | 11/2019 | Hertz | .................. | G06N 20/10 |
| 2019/0354883 A1* | 11/2019 | Aravamudan | ......... | G16B 50/00 |
| 2020/0143259 A1* | 5/2020 | Lindsley | ............. | G06N 5/048 |

OTHER PUBLICATIONS

Bangyong et al. "Association Search in Semantic Web: Search + Inference", Special interest tracks and posters of the 14th international conference on World Wide Web, pp. 992-993 (Year: 2005).*

Gupta et al., "Context based Indexing in Search Engines using Ontology", In International Journal of Computer Applications, Feb. 28, 2010, vol. 1, No. 14, pp. 49-52.

Extended European Search Report issued in European Patent Application No. EP18020073.5 dated Jun. 5, 2018, 10 pages.

* cited by examiner

METHOD AND SYSTEM FOR PERFORMING CONTEXT-BASED SEARCH

CROSS REFERENCE TO RELATED APPLICATIONS

This application claims priority to U.S. Provisional Patent Application No. 62/521,325, filed Jun. 16, 2017, which is hereby incorporated by reference in its entirety.

TECHNICAL FIELD

The present disclosure relates generally to data processing; and more specifically, to methods and systems for extraction of contextually relevant content from target database. Moreover, the present disclosure also relates to computer readable medium containing program instructions for execution on a computer system, which when executed by a computer, cause the computer to perform method steps for performing context-based search.

BACKGROUND

Generally, there is a lot of scope for research in advancing technological development in various fields. Specifically, research inspires innovation and promotes learning in community of scholars, scientists and inventors. Furthermore, there are number of available platforms which act as sources of information for researchers. Conventionally, printed media (such as books, encyclopaedias, and so forth) were a primary information source of knowledge and content. However, with advancements in technology, digital media has now replaced the printed media as an information source with easy accessibility and improved availability.

Typically, the digital media has a lot of data spread across various platforms. Consequently, existing search techniques require a lot of time and processing complexity for accessing contextually relevant data from these existing digital media platforms. Moreover, the contextually relevant data may be several years old and may be stored in a large number of documents that may not be easily accessible. Additionally, such documents may be in different formats that may not be supported by the existing search techniques. Moreover, there is always a risk of accessing non-relevant data. Furthermore, the existing searching techniques may not always generate optimal result and require a lot of effort. Moreover, searched data may not always have an exact intent corresponding to the user query.

Therefore, in light of the foregoing discussion, there exists a need to overcome the aforementioned drawbacks associated with the conventional method of searching context-based data.

SUMMARY

The present disclosure seeks to provide a method of performing context-based search. The present disclosure seeks to provide a system for performing context-based search. The present disclosure seeks to provide a solution to the existing problem of contextually irrelevant, time consuming, inefficient searching techniques. An aim of the present disclosure is to provide a solution that overcomes at least partially the problems encountered in prior art, and provide a seamless, faster and optimized method of performing context-based search from one or more target data with a notion of contextual relevance of data included therein.

In first aspect, an embodiment of the present disclosure provides a method of performing context-based search, wherein the method comprises:
developing a search database by:
extracting existing data, having data-records, from at least one target database, wherein each of the data records includes a plurality of data-units;
tagging the plurality of data-units with at least one class, based on an ontology; and
establishing semantic associations between the plurality of data-units, based on the ontology;
developing a search query by:
receiving a user query having one or more query segments;
tagging the one or more query segments with at least one class, based on the ontology; and
establishing semantic associations between the one or more query segments based on the ontology; and
retrieving at least one context-based data-record from the search database based on:
the one or more query segments;
the identified one or more classes associated with the one or more query segments; and
semantic associations between the one or more query segments.

In second aspect, an embodiment of the present disclosure provides a system for performing context-based search, wherein the system comprises:
a database arrangement operable to store at least one curated database and at least one target database;
a communication module operable to retrieve at least one curated database and at least one target database; wherein the communication module is operatively coupled to a processing module; and
the processing module operable to:
develop a search database by:
extracting existing data, having data records, from at least one target database, wherein each of the data records includes a plurality of data-units;
tagging the plurality of data-units with at least one class, based on an ontology; and
establishing semantic associations between the plurality of data-units, based on the ontology;
develop a search query by:
receiving a user query having one or more query segments;
tagging the one or more query segments with at least one class based on the ontology; and
establishing semantic associations between the one or more query segments based on the ontology; and
retrieving at least one context-based data-record from the search database is based on:
the one or more query segments;
the identified one or more classes associated with the one or more query segments; and
semantic associations between the one or more query segments.

In third aspect, an embodiment of the present disclosure provides a computer readable medium containing program instructions for execution on a computer system, which when executed by a computer, cause the computer to perform method steps for performing context-based search, the method comprising the steps of:

developing a search database by:
  extracting existing data, having data-records, from at least one target database, wherein each of the data records includes a plurality of data-units;
  tagging the plurality of data-units with at least one class, based on an ontology; and
  establishing semantic associations between the plurality of data-units, based on the ontology;
developing a search query by:
  receiving a user query having one or more query segments;
  tagging the one or more query segments with at least one class, based on the ontology; and
  establishing semantic associations between the one or more query segments based on the ontology; and
retrieving at least one context-based data-record from the search database based on:
  the one or more query segments;
  the identified one or more classes associated with the one or more query segments; and
  semantic associations between the one or more query segments.

Embodiments of the present disclosure substantially eliminate or at least partially address the aforementioned problems in the prior art, and provides an efficient and reliable method and system for extracting contextually relevant data.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
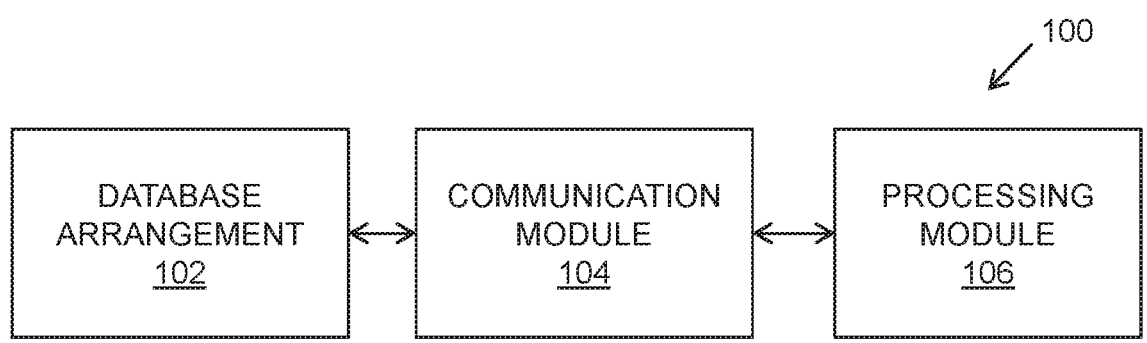
FIG. 1 is a block diagram of a system for performing context-based search, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of performing context-based search, wherein the method comprises:
  developing a search database by:
    extracting existing data, having data-records, from at least one target database, wherein each of the data records includes a plurality of data-units;
    tagging the plurality of data-units with at least one class, based on an ontology; and
    establishing semantic associations between the plurality of data-units, based on the ontology;
  developing a search query by:
    receiving a user query having one or more query segments;
    tagging the one or more query segments with at least one class, based on the ontology; and
    establishing semantic associations between the one or more query segments based on the ontology; and
  retrieving at least one context-based data-record from the search database based on:
    the one or more query segments;
    the identified one or more classes associated with the one or more query segments; and
    semantic associations between the one or more query segments.

In another aspect, an embodiment of the present disclosure provides a system for performing context-based search, wherein the system comprises:
  a database arrangement operable to store at least one curated database and at least one target database;
  a communication module operable to retrieve at least one curated database and at least one target database; wherein the communication module is operatively coupled to a processing module; and
  the processing module operable to:
    develop a search database by:
      extracting existing data, having data records, from at least one target database, wherein each of the data records includes a plurality of data-units;
      tagging the plurality of data-units with at least one class, based on an ontology; and
      establishing semantic associations between the plurality of data-units, based on the ontology;
    develop a search query by:
      receiving a user query having one or more query segments;
      tagging the one or more query segments with at least one class based on the ontology; and establishing semantic associations between the one or more query segments based on the ontology; and retrieving at least one context-based data-record from the search database is based on:
the one or more query segments;
the identified one or more classes associated with the one or more query segments; and
semantic associations between the one or more query segments.

The present disclosure seeks to provide a system and method of performing context-based search and enables efficient and reliable extraction of context-based content from target data. Beneficially, the present disclosure provides user with an efficient method involving reduced processing and time complexity. Moreover, the method aims at decreasing huge volume of information contained in the target data to an easily manageable search database. Specifically, there is a significant reduction in loss of user query context as every segment of the user query, is contextually analysed and tagged with at least one or more class during the process of extracting the context-based content. Consequently, the method performs extraction of context-based content with an understanding regarding the ontology and context of the field of user's interest.

Throughout the present disclosure, the term "context-based search" relates to searching (namely, finding, accessing and so forth) for contextually relevant information. Additionally, the contextually relevant information may be based on inferred meaning of the one or more keywords included in the user query. Specifically, the one or more keywords may have multiple meanings and semantic associations thereof, abbreviations, linguistic variations and so forth associated with them. More specifically, the context-based search may take into account such associations with keywords to provide content relevant to the user. In other words, context-based search aims to access information based on conceptual meaning of user query and keywords included therein.

Throughout the present disclosure, the term "ontology" relates to a set of concepts (namely, information, ideas, data, semantic associations and so forth) in a field (namely, subject area, domain and so forth) that details types and properties of the set of concepts and semantic association thereof. Furthermore, ontology provides a base for context-based search to extract contextually (namely, conceptually) relevant information pertaining to the field of user's interest. Moreover, ontology provides a structured, optimal and relevant set of concepts pertaining to the user's field of interest. Furthermore, ontology may be used in scientific research, academic studies, market analysis and so forth. Optionally, ontology may include concepts in form of text, image, audio, video, or any combination thereof. Additionally, the ontology may provide information on how a certain concept in a certain field may be associated with one or more concept in multiple fields.

Optionally, the method of performing the context-based search comprises: developing the ontology using at least one curated database. Furthermore, field of the at least one curated database is related to the developed ontology. Specifically, the at least one curated database may comprise information providing details on associations between a plurality of concepts. Additionally, the ontology is developed to include relevant information extracted from the at least one curated database pertaining to the field of user's interest. Optionally, the at least one curated database includes information in form of text, image, audio, video, or any combination thereof.

In an example, at least one curated database may comprise information related to biomedical entities, genes, proteins, drugs, diseases, species, pathways, biological processes, molecular functions, side effects, drug labels, clinical trial parameters, patient demographics and many other semantic types thereof. Furthermore, the at least one curated database may be extracted to build a Life Science ontology (including custom dictionary and metathesaurus) containing synonyms, derivational and functional form of different biomedical entities as well as Medical Subject Headings (MeSH). Furthermore, optionally, the at least one curated database and ontology extracted from thereof may include data about Authors, geography and other biological and non-biological entities.

In an embodiment, developing an ontology using at least one curated database comprises: applying conceptual indexing to data-records stored in the at least one curated database, wherein the data-records may include a plurality of data-units. Optionally, conceptual indexing may include parsing of plurality of data-units of the at least one curated database. Furthermore, parsing may generate one or more conceptual structure representing assembly of the plurality of data-units to construct a relation therebetween. Moreover, conceptual indexing may be applied to data-records to identify contextual meaning thereof. Beneficially, data-records may be organized based on conceptual indexing thereof. Optionally, data-records may be a set of information related to an entity, object and so forth. Furthermore, each individual piece of information about the object and so forth may form a data-unit. In an example, at least one curated database may include information related to books, author name, publication and so forth. Furthermore, data-records stored in the at least one curated database may include information about one or more books. Moreover, data-records corresponding to one or more books may include data units pertaining to the one or more books (namely, book name, author name, publication and so forth).

In an embodiment, developing an ontology using at least one curated database comprises: identifying semantic associations between the plurality of data-units, established in the at least one curated database. Furthermore, associations (namely relations, links and so forth) among the plurality of data-units may be identified based on the conceptual indexing applied to data-records stored in the at least one curated database. Beneficially, identifying semantic associations provide contextual (namely, inferred) relationships of the plurality of data-units. Optionally, the semantic associations established in the at least one curated database are identified using at least one of: knowledge-based text mining, natural language processing. Furthermore, knowledge-based text mining provides semantic association between the plurality of data-units based on identifying and analysing known information and associations.

Throughout the present disclosure, the term "class" relates to a collection (namely, cluster, group and so forth) of contextually similar text, audio, video, image or a combination thereof. Furthermore, the class may include many synonyms, abbreviations, linguistic variations, morphological forms and/or derivational entities for the plurality of data-units associated therewith. In an example, "pain" may be associated with a class containing similar entities like cramp, ache, discomfort, spasm and so forth.

In an embodiment, developing an ontology using at least one curated database comprises: identifying at least one class tagged with the plurality of data-units in the at least one curated database. Furthermore, data-records may be included in the at least one class (namely, group, cluster and so forth) based on contextual similarity thereof. In an example, at least one class may be recognized by a traditional indexer using tf-idf (term frequency-inverse document frequency) weighting method. Additionally, tf-idf may act as a numerical statistic that may be intended to reflect how important a word may be to a document in a collection. Optionally, tf-idf may be used as a weighting factor (namely, provides notion of importance) in information retrieval, text mining and so forth. Furthermore, the class may be an organized set of data-units comprising elements of data having a similar contextual meaning pertaining to the field of user's interest.

As mentioned previously, the system for performing context-based search comprises: a database arrangement operable to store the at least one curated database. Furthermore, the at least one curated database for developing ontology may be accessed from the database arrangement. Optionally, the database arrangement may be document or wide column database (for example MongoDB, HBase and so forth) for data persistence and analytics. Additionally, optionally, the database arrangement may be a search engine database (for example ElasticSearch and so forth) for instant information retrieval based on user query. Moreover, in an example, the database arrangement may be a graph database (for example Neo4J, ArangoDB and so forth) to exploit concept relationships and empower discovery based on user's context. Furthermore, the system for performing context-based search comprises: a communication module operable to retrieve at least one curated database. Beneficially, the database arrangement is operatively coupled to a communication module. Consequently, coupling of the database arrangement and the communication module facilitates the access of the at least one curated database.

Throughout the present disclosure, the term "database arrangement" as used herein relates to an organized body of digital information regardless of the manner in which the data or the organized body thereof is represented. Optionally, the database arrangement may be hardware, software, firmware and/or any combination thereof. For example, the organized body of related data may be in the form of a table, a map, a grid, a packet, a datagram, a file, a document, a list or in any other form. The database arrangement includes any data storage software and systems, such as, for example, a relational database like IBM DB2 and Oracle 9. Furthermore, the database arrangement refers to the software program for creating and managing one or more databases. Optionally, the database arrangement may be operable to supports relational operations, regardless of whether it enforces strict adherence to the relational model, as understood by those of ordinary skill in the art.

Throughout the present disclosure, the term "communication module" relates to an arrangement of interconnected programmable and/or non-programmable components that are configured to facilitate data communication between one or more electronic devices, software modules and/or databases, whether available or known at the time of filing or as later developed. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. The communication module is operable to access the at least one curated database and communicate the accessed data to the processing module. Furthermore, the system for performing context-based search comprises: the processing module. The communication module accesses data from the database arrangement and provides the accessed data to the processing module.

Throughout the present disclosure, the term "processing module" used herein relates to a computational element that is operable to respond to and process instructions that carry out the method. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing module" may refer to one or more individual processors, processing devices and various elements associated with a processing device that may be shared by other processing devices. Additionally, the one or more individual processors, processing devices and elements are arranged in various architectures for responding to and processing the instructions that drive the system. Beneficially, the processing module is operatively coupled to the communication module. Consequently, the coupling of processing module and communication module enables an exchange of data between the database arrangement and the processing module. Furthermore, the processing module is operable to develop an ontology using at least one curated database. Additionally, the processing module takes the at least one curated database as input from the database arrangement using the communication module. Consequently, the processing module provides the ontology as output.

As mentioned previously, the method of performing context-based search comprises: developing a search database. Furthermore, a search database is a set of indexed, organized and semantically associated database generated by extracting information pertaining to the field of user's interest. The search database is analysed and processed in order to facilitate context-based search. Furthermore, developing a search database comprises: extracting existing data, having data-records, from at least one target database, wherein each of the data records includes a plurality of data-units. The at least one target database is accessed to extract the existing data. Optionally, the existing data may be in the form of text, image, audio, video, or any combination thereof.

Additionally, the target database is a set of data that needs to be analysed in order to extract existing data. Specifically, the target data may be asymmetrical, unstructured and/or unordered. Optionally, the target data may be in a portable document format (PDF), web page, Joint Photographic Experts Group. (JPEG) file, MS-WORD file and/or a combination thereof. Optionally, the database arrangement may be operable to store the at least one target database. Additionally, the processing module may access the at least one target data using the communication module. Optionally, the communication module is operable to retrieve at least one target database. Beneficially, the database arrangement is communicably coupled to the communication module enabling the retrieval of at least one target database.

Moreover, the existing data relates to information pertaining to a field of user's interest. Furthermore, the existing data may be unstructured data (namely facts and/or figures) pertaining to the field of user's interest. Optionally, the existing data may be for research purposes, academic studies, market analyses and so forth. Additionally, the processing module is operable to develop a search database by extracting existing data, having data-records, from at least one target database, wherein each of the data records includes a plurality of data-units. Moreover, the processing module extracts contents of the target database in order to generate a search database obtaining more relevant and optimal context of data.

Optionally, extracting existing data from at least one target database comprises using at least one of: natural language processing, text analytics and machine learning techniques. Furthermore, natural language processing, text analytics and machine learning may be used in order to perceive contextual (namely, semantic, inferred) meaning of the elements in the existing data. Furthermore, aforementioned techniques analyse (namely, parsing, comparing and so forth) elements of the target database in order to identify contextual meaning thereof. Moreover, co-occurrence of elements of the target data may be checked. Furthermore, co-occurrence of elements of the target data refers to use of the elements of the target data together in order to convey information. Additionally, optionally, the processing module is operable to extract existing data from at least one target database comprises using at least one of: natural language processing, text analytics and machine learning techniques. Furthermore, the processing module employs a learning and/or a data mining technique on the at least one target database in order to extract existing data to form the search database.

As mentioned previously, developing a search database comprises tagging the plurality of data-units with at least one class, based on the ontology. Furthermore, tagging the plurality of data-units provides added information regarding context thereof. In an example, tagging the plurality of data-units with at least one class may be done with text, identifier, symbol and so forth. Moreover, the at least one class relates to a domain pertaining to a set of concepts included in the ontology. Furthermore, the processing module is operable to develop the search database by tagging the plurality of data-units with at least one class, based on the ontology. Additionally, the processing module analyses the context of the plurality of data-units. Consequently, the data units are tagged with at least one class based on contextual thereof. Additionally or alternatively, optionally, the plurality of data-units may be tagged with at least one class in real-time when retrieving context-based search results based on the search query.

As mentioned previously, developing the search database comprises: establishing semantic associations between the plurality of data-units, based on the ontology. Furthermore, ontology provides a basis for identifying and analysing the conceptual meaning of the plurality of data-units. Furthermore, identified semantics associations from the ontology are used to establish links (namely, relationship, association and so forth) between the plurality of data-units. Beneficially, the semantic associations provide a conceptually organized, assembled and easily accessible set of data-units in form of the search database. It is to be understood that the associations established between the plurality of data-units may associate the data-records that the plurality of data-units are included in. Furthermore, the processing module is operable to establish semantic associations between the plurality of data-units, based on the ontology. Consequently, the processing module generates the search database comprising of semantic associations between the data-units included therein.

Throughout the present disclosure, the term "user query" relates to a text provided by a user in order to extract relevant information. Moreover, the relevant information may be pertaining to a field of user's interest. Furthermore, the relevant information may have data related to one or more keywords of user query included therein.

The method of performing context-based search comprises developing a search query. Specifically, a search query is developed by receiving the user query having one or more query segments. Additionally, the search query is a processed form of the user query. The search query includes one or more query segments (namely, fragments, elements, phrases and so forth) and contextual (namely, conceptual, semantic and so forth) association thereof. Moreover, the query segments are parts of search query having a significant contextual meaning. Furthermore, the processing module is operable to receive a user query having one or more query segments. Moreover, the processing module is operable to analyse the user query based on context of elements included therein. Additionally, the user query is in text format. Optionally, the user query may be provided using a command prompt (cmd), user interface (UI) and so forth.

Optionally, developing a search query may also comprise expanding the user query to include at least one of: lexical variants for one or more query segments, synonyms of one or more query segments, abbreviations of one or more query segments. Furthermore, spell checks for the user query may be performed. Additionally, lexical variants, word stems and so forth may be analysed in order to standardize (namely, bringing to a canonical form) the one or more query segments.

Optionally, developing a search query further comprises converting the user query in machine-readable format. Furthermore, converting the user query in machine-readable format may be carried out by parsing and cleaning of the one or more query segments. In an example, in the user query may be converted in JSON or other convenient format.

Optionally, the processing module is operable to convert the user query in a machine-readable format. Beneficially, converting the user query in machine readable format provides a faster and more efficient platform for carrying out the context-based search.

As mentioned previously, developing the search query comprises: tagging the one or more query segments with at least one class, based on the ontology. Furthermore, the user query includes the one or more query segments having a specific conceptual significance. Consequently, the one or more query segments are tagged with class (namely, text, symbol, identifier and so forth) based on concepts identified in the ontology. In an example, a user provides a user query "John Smith publications related to metformin and diabetes". Furthermore, "John Smith" may be identified as a specific author; "publications" may be identified as output data set; "metformin" may be identified as a drug; "diabetes" may be identified as an indication and "related to" and "and" are operators.

Optionally, the user query may be then expanded to include all known synonyms, relationships and so forth to enhance result coverage. For example, metformin may be expanded to include "metformin hydrochloride", brand name "Glumetza" and so forth. Furthermore, the one or more query segments are then combined with their known relationships (namely, concepts, class, tags and so forth) in the ontology.

Furthermore, the processing module is operable to tag the one or more query segments with at least one class, based on the ontology. Beneficially, tagging the one or more query segments associated with the at least one class provides a more organized, assembled and manageable form of the user query. Consequently, tagging provides an easier understanding of contextual (namely, inferred) meaning of the one or more query segments of the user query.

Moreover, developing the search query comprises: establishing semantic associations between the one or more query segments based on the ontology. Furthermore, the one or more query segments are associated together based on contextual meaning thereof. Beneficially, the association of the one or more query segments provides a notion regarding inferred meaning of the user query. The semantic associations between the one or more query segments are based on the context of the at least one class. Furthermore, the processing module is operable to establishing semantic associations between the one or more query segments based on the ontology. Beneficially, the processing module develops a search query pertaining to the field of user's interest by processing the user query provided by the user.

Furthermore, the method of performing context-based search comprises: retrieving at least one context-based data-record from the search database. Beneficially, the context-based search generates a user-specific result pertaining to the field of user's interest. Consequently, the context-based search provides a conceptually-relevant result for the user query provided by the user. Moreover, the processing module is operable to retrieve at least one context-based data-record from the search database. Additionally, the processing module is operatively coupled to the communication module facilitating the retrieval of relevant data from the database arrangement. Furthermore, the processing module is operable to perform operations (namely, tagging, indexing, parsing, cleaning assembling, organizing and so forth) on the data retrieved from the database arrangement.

As mentioned previously, retrieving the at least one context-based data-record from the search database is based on: the one or more query segments. Furthermore, the at least one context-based data-record is retrieved (namely, accessed) based on inferred (namely, conceptual, contextual and so forth) meaning of the one or more query segments. Beneficially, retrieval of the at least one context-based data-record based on inferred meaning of the one or more query segments provides an optimal (namely, best-fit, appropriate and so forth) result corresponding to the user query. Furthermore, the processing module is operable to retrieve the at least one context-based data-record from the search database based on: the one or more query segments. The processing module is operable access the database arrangement and retrieve data-records based on semantic meaning thereof. Furthermore, the data-records having a relevant context with the one or more query segments are retrieved (namely, accessed).

Furthermore, retrieving the at least one context-based data-record from the search database is based on: the identified one or more classes associated with the one or more query segments. Specifically, the identified one or more classes provide a definite notion regarding context of the one or more query segments. Beneficially, the context of the one or more query segments provides an appropriate inference of the user-query. The identified one or more classes associated with the one or more query segments may contain text, images, video, audio and so forth with similar contextual meaning. Consequently, identification of the one or more class may provide many synonyms, abbreviations, linguistic variations, morphological forms and/or derivational entities for the one or more query segments associated therewith. Furthermore, the identified one or more classes associated with the one or more query segments narrow the context-based search to inferred meaning of the identified classes. Moreover, the processing module is operable to retrieve the at least one context-based data-record from the search database based on the identified one or more classes associated with the one or more query segments. Additionally, the processing module is operable to analyse the at least one context-based data-record and identify significance thereof corresponding to the identified one or more classes associated with the one or more query segments.

As mentioned previously, retrieving the at least one context-based data-record from the search database is based on: semantic associations between the one or more query segments. Furthermore, the associations between the one or more query segments aids to contextual analysis of the user-query. Beneficially, the semantic associations between the one or more query segments provide inferred meaning of the user query. Consequently, the context-based search generates most optimal result for the user query by extracting data blocks from the search database. Furthermore, the processing module is operable to retrieve the at least one context-based data-record from the search database based on: the semantic associations between the one or more query segments. Beneficially, the processing module is operable to identify the semantic (namely, contextual) association between the one or more query segments. Consequently, exact notion of context of the user query is perceived by the processor.

Optionally, the method of performing context-based search comprises retrieving the at least one context-based data-record from the search database using Hopfield algorithm. Furthermore, the Hopfield algorithm may be used to retrieve the data-records that are related to the one or more query segments provided by the user. The Hopfield algorithm first activates neighbours of the one or more query segments by combining tf-idf weight calculated by the Hopfield algorithm. The Hopfield algorithm then repeats activation process on neighbours thereof. As the algorithm may be iterative, activation process may spread away from the one or more query segments (namely, gradually decreasing). Consequently, the one or more query segments may be eventually excluded from the activation. Due to the fact that associative retrieval provides synonym terms or terms that have very similar meaning, these terms can be considered as representations of the same concepts. Additionally, optionally, the processing module may be operable to retrieve at least one context-based data-record from the search database using the Hopfield algorithm. Furthermore, the processing module may be operable to execute the Hopfield algorithm on the search database extracting relevant data-records. Optionally, retrieved result may be filtered based on user profile, background (namely, user type, past search and so forth).

In an embodiment, the method of performing context-based search comprises generating a summary of the retrieved at least one context-based data-record. Furthermore, tags for the plurality of data-units may be retrieved and analysed to find most common tags for the plurality of data-units. For example, most common disease when searching for BRCA1 may be breast cancer. In an example, the summary may be generated based on chi-square distribution. Optionally, the processing module may be further operable to generate a summary of the retrieved at least one context-based data-record. Furthermore, the processing module may be operable to retrieve and analyse the contextual meaning, class, tags and so forth associated with the one or more data-units. Consequently, the processing module may be operable to provide a digest (namely, gist) of the context-based search.

In an exemplary implementation, an ontology is developed comprising concepts, facts, figures and so forth pertaining to life sciences. Furthermore, the ontology is developed by crawling publicly available curated databases of biological entities. Additionally conceptual indexing is applied to data-records stored in the publicly available curated database. Furthermore, semantic associations between the data records are identified. Consequently, the data records are tagged with at least one class based on semantic association thereof generating the ontology. Moreover, a search database is generated by extracting information about biological entities from a provided target database, containing information pertaining to biological entities. Additionally, data-records of the extracted information are tagged with classes (namely, symptoms, disease, organs and so forth). Moreover, the tagged data-records of the extracted information are checked for semantic associations thereof. Consequently, once the ontology and the search database are developed a user query is entered by a user regarding symptoms of chest tuberculosis. The one or more segments of the user query is tagged with classes "tuberculosis is tagged with class disease", "chest is tagged with class organ". Furthermore, semantic association between the one or more segments is established. Moreover, a context-based data record is retrieved from the search database based on the classes tagged with the one or more segments of the user query.

Furthermore, there is disclosed a computer readable medium containing program instructions for execution on a computer system, which when executed by a computer, cause the computer to perform method steps for performing context-based search, the method comprising the steps of developing a search database; developing a search query; retrieving at least one context-based data-record from the search database. Additionally, the search database is developed extracting existing data, having data-records, from at least one target database, wherein each of the data records includes a plurality of data-units; tagging the plurality of data-units with at least one class, based on an ontology; and establishing semantic associations between the plurality of data-units, based on the ontology. Moreover, the search query is developed by receiving a user query having one or more query segments; tagging the one or more query segments with at least one class, based on the ontology; and establishing semantic associations between the one or more query segments based on the ontology. Furthermore, at least one context-based data-record is retrieved from the search database based on the one or more query segments; the identified one or more classes associated with the one or more query segments; and semantic associations between the one or more query segments.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated is a block diagram of a system 100 of performing context-based search, in accordance with an embodiment of the present disclosure. The system 100 comprises a database arrangement 102 operable to store at least one curated database and at least one target database. Furthermore, the system 100 comprises a communication module 104 operable to retrieve at least one curated database and at least one target database from the database arrangement 102. The communication module 104 is operatively coupled to the processing module 106. The processing module 106 is operable to develop an ontology using at least one curated database, develop a search database, and develop a search query and retrieving at least one context-based data-record from the search database. Optionally, the processing module 106 is further operable to generate a summary of the retrieved at least one context-based data-record.

Figure 2:
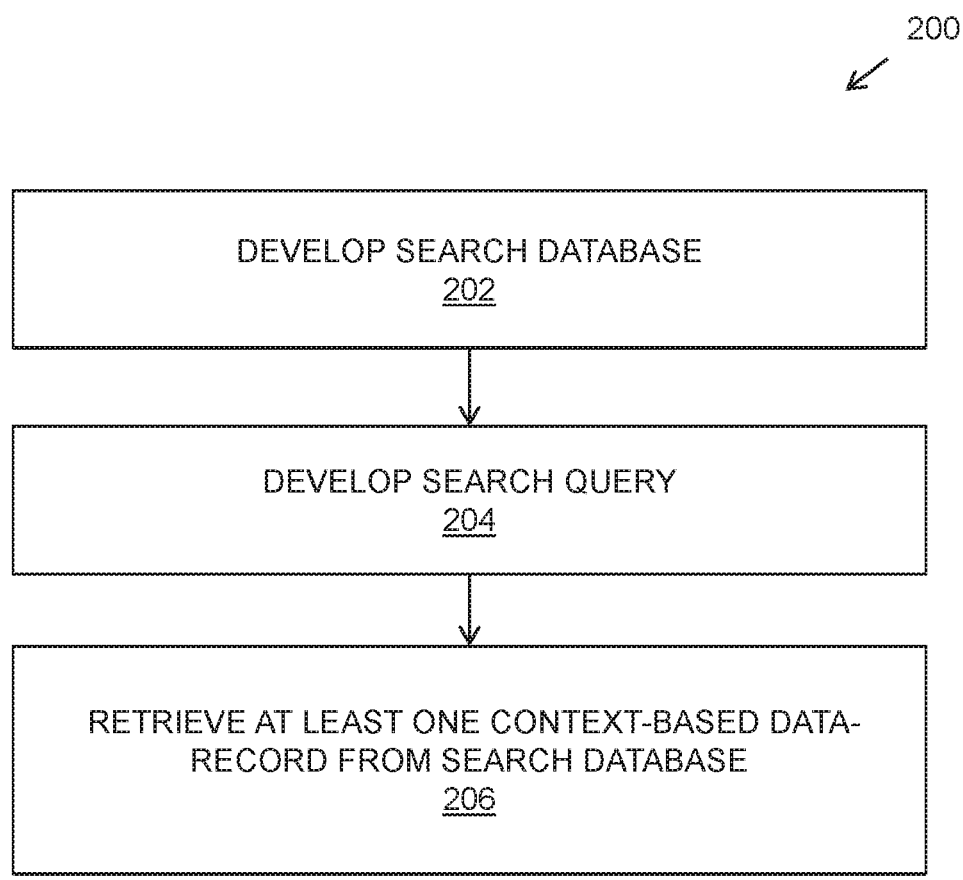
FIG. 2 is an illustration of steps of a method of performing context-based search, in accordance with an embodiment of the present disclosure.

Referring to FIG. 2, illustrated are steps of a method 200 for performing context-based search, in accordance with an embodiment of the present disclosure. The method 200 is executable by a processing module 106. At a step 202, search database is developed. Specifically, the at least one curated database includes data records pertaining to the field of ontology. At a step 204, search query is developed. The search query is developed based on the one or more segments of user query. At a step 206, at least one context-based data-record from search database is retrieved.

Figure 3:
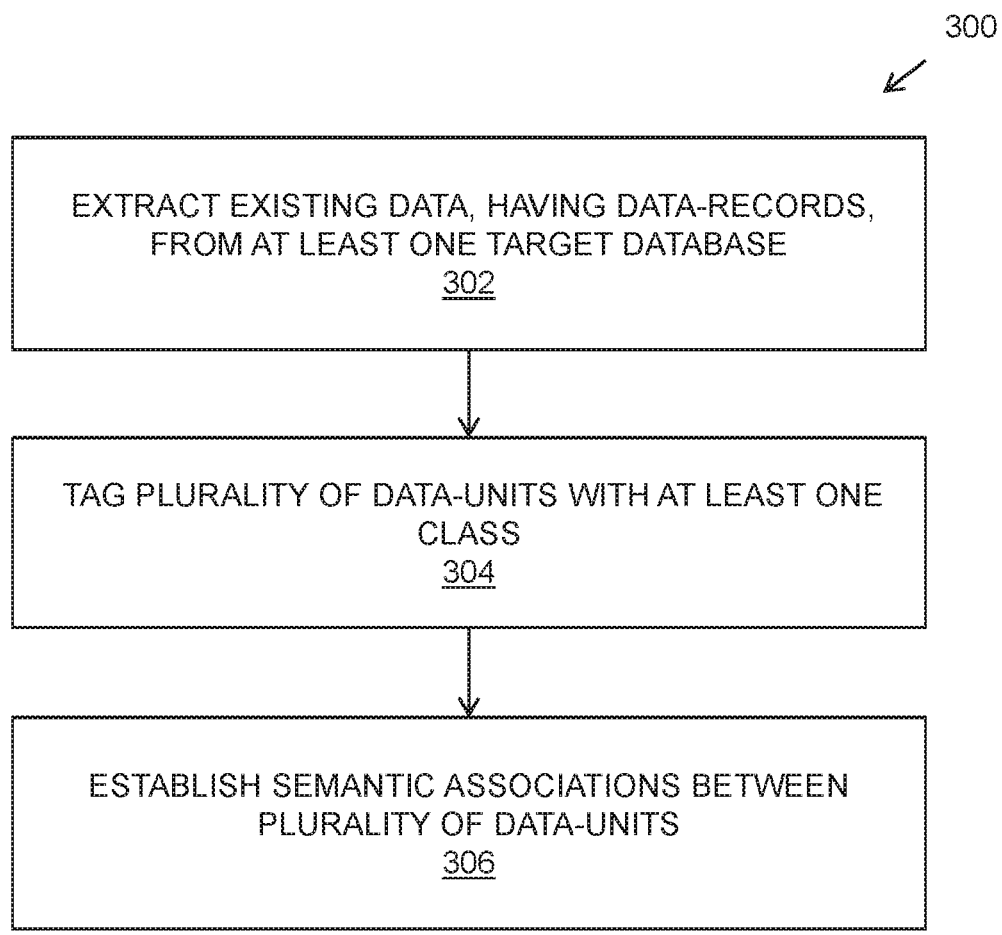
FIG. 3 is an illustration of steps of method for developing a search database, in accordance with an embodiment of the present disclosure.

Referring to FIG. 3, illustrated are steps of a method 300 for developing a search database, in accordance with an embodiment of the present disclosure. At a step 302, existing data is extracted, having data-records, from at least one target database. Specifically, the data-records are contextually relevant data-records extracted from the at least one target database. At a step 304, plurality of data-units is tagged with at least one class. Furthermore, the at least one class specifies the contextually similar type of data-units. At a step 306, semantic association between plurality of data-units is established. Furthermore, the semantic associations organize the search database in an easily accessible, organized and manageable data structure.

Figure 4:
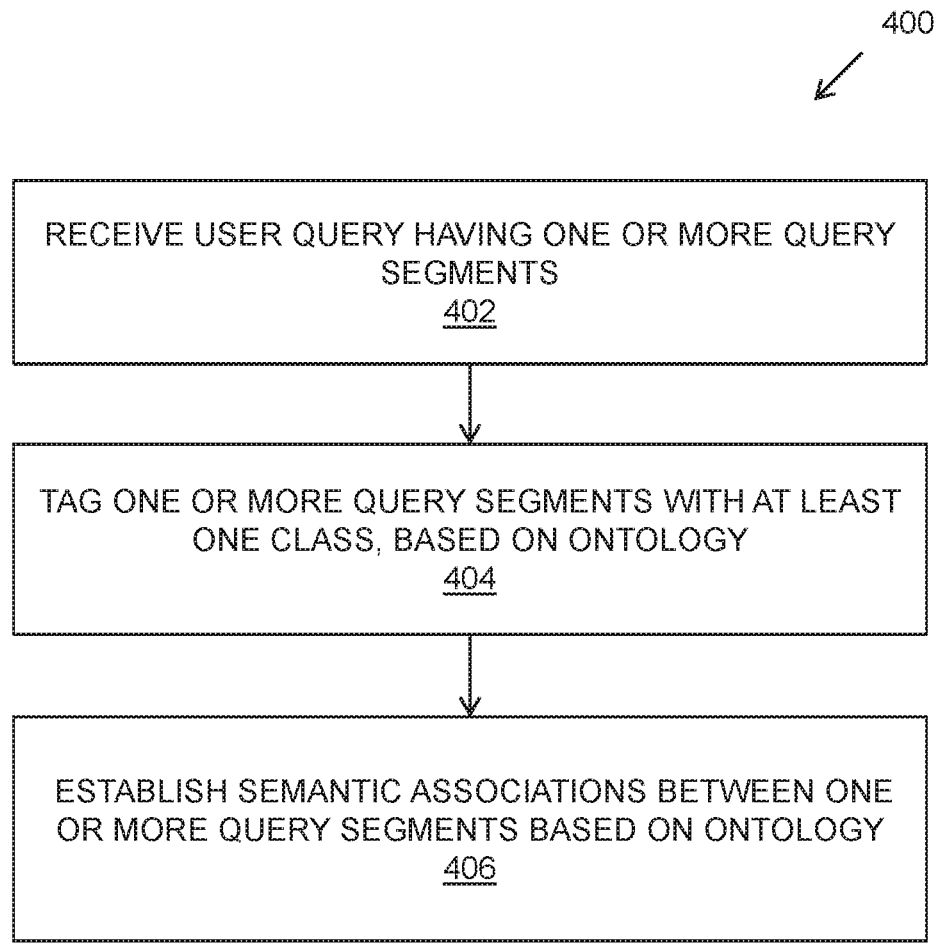
FIG. 4 is an illustration of steps of method for developing a search query, in accordance with an embodiment of the present disclosure.

Referring to FIG. 4, illustrated are steps of a method 400 for developing a search query, in accordance with an embodiment of the present disclosure. At a step 402, a user query having one or more query segments is received. Specifically, the one or more query segments are parts of user query with a significant contextual meaning. At a step 404, the one or more query segments are tagged with at least one class, based on ontology. Additionally, the at least one class is created based on inferred meaning associated therewith. At a step 406, semantic association between one or more query segments is established based on the ontology. Furthermore, the semantic associations provide a notion of direct and indirect contextual relationships between one or more query segments.

Figure 5:
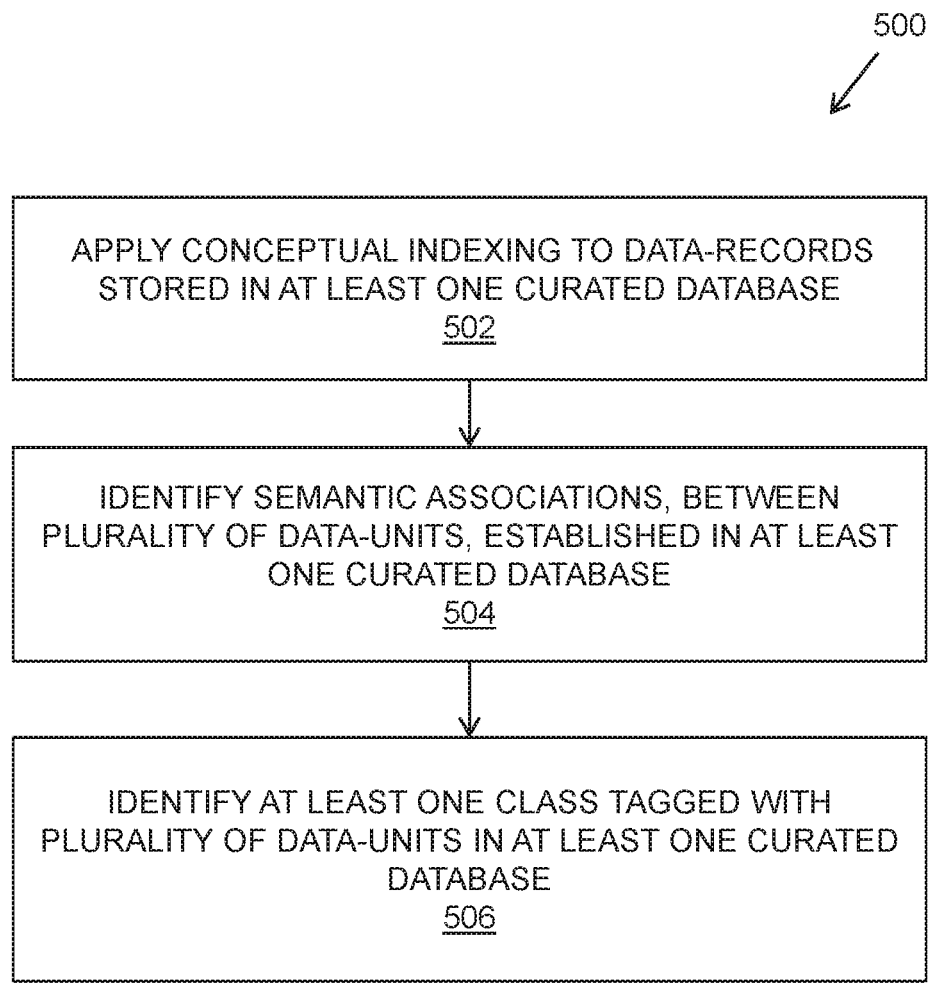
FIG. 5 is an illustration of steps of method for developing an ontology using at least one curated database, in accordance with an embodiment of the present disclosure.

Referring to FIG. 5, illustrated are steps of a method 500 for developing an ontology using at least one curated database, in accordance with an embodiment of the present disclosure. At a step 502, conceptual indexing is applied to data-records stored in at least one curated database. Specifically, conceptual indexing organizes the data-records depending on contextual meaning thereof. At a step 504, semantic associations between plurality of data-units established in at least one curated database is identified. Additionally, the identified semantic association provides a connection between the conceptually indexed data-records. At a step 506, at least one class tagged with plurality of data-units in at least one curated database is identified. Furthermore, tagging with class combines the semantically associated data-records depending upon content thereof.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of performing context-based search, wherein the method comprises:

developing a search query by:
receiving a user query having query segments wherein the user query comprises information pertaining to a field of user's interest;
expanding the user query to include at least one of: lexical variants for the query segments, synonyms of the query segments, abbreviations of the query segments to standardize the query segments;
tagging each of the query segments with at least one class, based on an ontology, wherein the at least one class tagged with a given query segment relates to an organized set of data elements having a similar contextual meaning pertaining to the field of the given query segment, wherein the tagged at least one class with each of the query segments relates to a domain pertaining to a set of concepts included in the ontology, wherein the at least one class relates to at least one of contextually similar text, audio, video and image;
establishing semantic associations between the query segments within the user query based on the tagged at least one class of the ontology with each of the query segments, wherein the tagged query segments are checked for the semantic associations therebetween, wherein the semantic associations provide direct and indirect contextual relationships between the query segments within the user query; and
converting the user query to a machine-readable format; and retrieving at least one context-based data-record from a search database based on the identified at least one class associated with the query segments, and the established semantic associations between the query segments within the user query, wherein the at least one context-based data-record from the search database is retrieved using a Hopfield algorithm, wherein the search database is a set of indexed, organized and semantically associated databases and generated by extracting information pertaining to the field of user's interest.

2. The method of claim 1, wherein the method further comprises generating a summary of the retrieved at least one context-based data-record.

3. The method of claim 1, wherein the method comprises developing the ontology using at least one curated database by:
applying conceptual indexing to data-records stored in the at least one curated database, wherein the data-records include a plurality of data-units;
identifying semantic associations, between the plurality of data-units, established in the at least one curated database; and
identifying at least one class tagged with the plurality of data-units in the at least one curated database.

4. The method of claim 3, wherein the semantic associations established in the at least one curated database are identified using at least one of: knowledge-based text mining and natural language processing.

5. The method of claim 1, wherein the search database is developed by extracting existing data, having data-records, from at least one target database, wherein extracting existing data from the at least one target database comprises using at least one of: natural language processing, text analytics and machine learning techniques.

6. A system for performing context-based search, wherein the system comprises:
a database arrangement operable to store at least one curated database and at least one target database;
a communication module operable to retrieve the at least one curated database and the at least one target database, wherein the communication module is operatively coupled to a processing module; and
the processing module operable to:
develop a search query by:
receiving a user query having query segments wherein the user query comprises information pertaining to a field of user's interest;
expanding the user query to include at least one of: lexical variants for the query segments, synonyms of the query segments, abbreviations of the query segments to standardize the query segments;
tagging each of the query segments with at least one class based on an ontology, wherein the at least one class tagged with a given query segment relates to an organized set of data elements having a similar contextual meaning pertaining to the field of the given query segment, wherein the tagged at least one class with each of the query segments relates to a domain pertaining to a set of concepts included in the ontology, wherein the at least one class relates to at least one of contextually similar text, audio, video and image;
establishing semantic associations between the query segments within the user query based on the tagged at least one class of the ontology with each of the query segment, wherein the tagged query segments are checked for the semantic associations therebetween, wherein the semantic associations provide direct and indirect context relationships between the query segments within the user query; and
converting the user query to a machine-readable format; and
retrieve at least one context-based data-record from a search database based on the identified at least one class associated with the query segments, and the established semantic associations between the query segments within user query, wherein the at least one context-based data-record from the search database is retrieved using a Hopfield algorithm, wherein the search database is a set of indexed, organized and semantically associated databases and generated by extracting information pertaining to the field of user's interest.

7. The system of claim 6, wherein the processing module is further operable to generate a summary of the retrieved at least one context-based data-record.

8. The system of claim 6, wherein the processing module is operable to develop the ontology using at least one curated database by:
applying conceptual indexing to data-records stored in the at least one curated database, wherein the data-records include a plurality of data-units;
identifying semantic associations, between the plurality of data-units, established in the at least one curated database; and identifying at least one class tagged with the plurality of data-units in the at least one curated database.

9. The system of claim 6, wherein the search database is developed by extracting existing data, having data-records, from at least one target database, wherein the processing module is operable to extract existing data from the at least one target database comprises using at least one of: natural language processing, text analytics and machine learning techniques.

10. A non-transitory computer readable medium containing program instruction for execution on a computer system, which when executed by a computer, cause the computer to perform method steps for performing context-based search, the method comprising the steps of:

developing a search query by:

receiving a user query having query segments, wherein the user query comprises information pertaining to a field of user's interest;

expanding the user query to include at least one of: lexical variants for the query segments, synonyms of the query segments, abbreviations of the query segments to standardize the query segments;

tagging each of the query segments with at least one class, based on the ontology, wherein the at least one class tagged with a given query segment relates to an organized set of data elements having a similar contextual meaning pertaining to the field of the given query segment, wherein the tagged at least one class with each of the query segments relates to a domain pertaining to a set of concepts included in the ontology, wherein the at least one class relates to at least one of contextually similar text, audio, video and image;

establishing semantic associations between the query segments within the user query based on the tagged at least one class of the ontology with each of the query segments, wherein the tagged query segments are checked for the semantic associations therebetween, wherein the semantic associations provide direct and indirect context relationships between the query segments within the user query; and converting the user query to a machine-readable format; and retrieving at least one context-based data-record from a search database based on the identified at least one class associated with the query segments, and the established semantic associations between the query segments within the user query, wherein the at least one context-based data-record from the search database is retrieved using a Hopfield algorithm, wherein the search database is a set of indexed, organized and semantically associated database and generated by extracting information pertaining to the field of user's interest.

\* \* \* \* \*